March 18, 1969  S. L. MERKEL  3,432,943
MATHEMATICS TEACHING DEVICE
Filed March 2, 1967  Sheet _1_ of 3
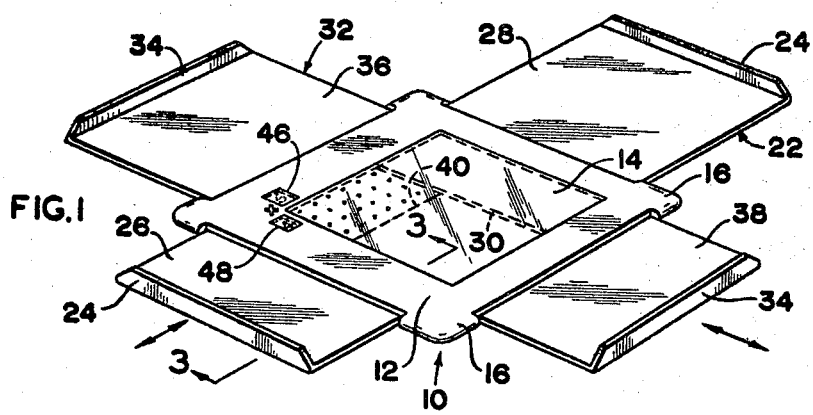
FIG.1
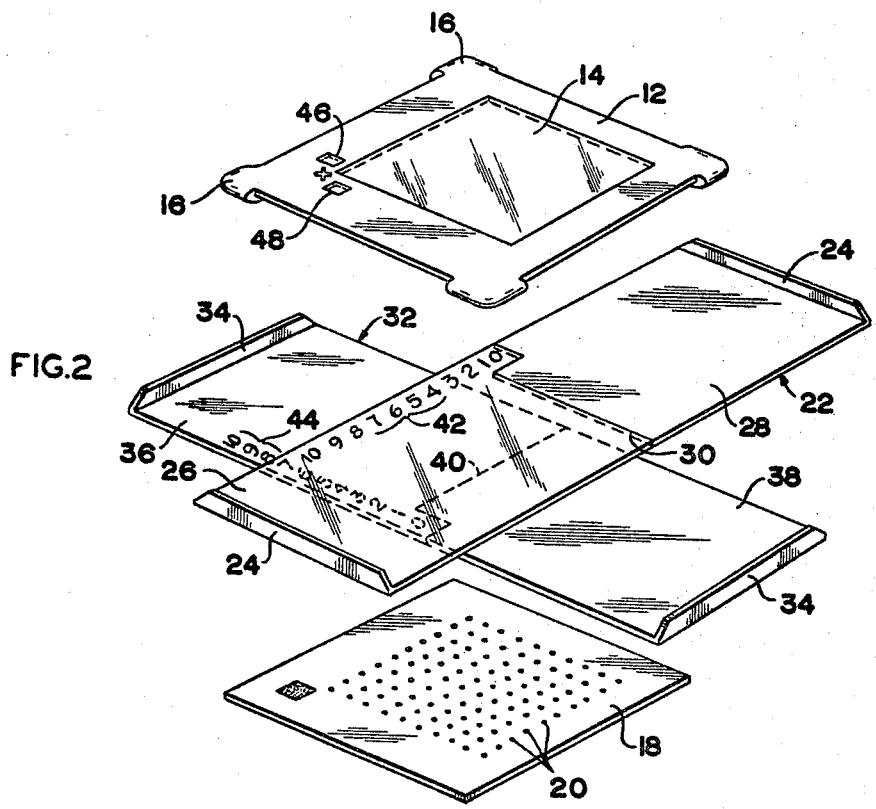
FIG.2
FIG.3
INVENTOR.
STEPHAN L. MERKEL
BY
Meyer, Tilberry & Body
ATTORNEYS.

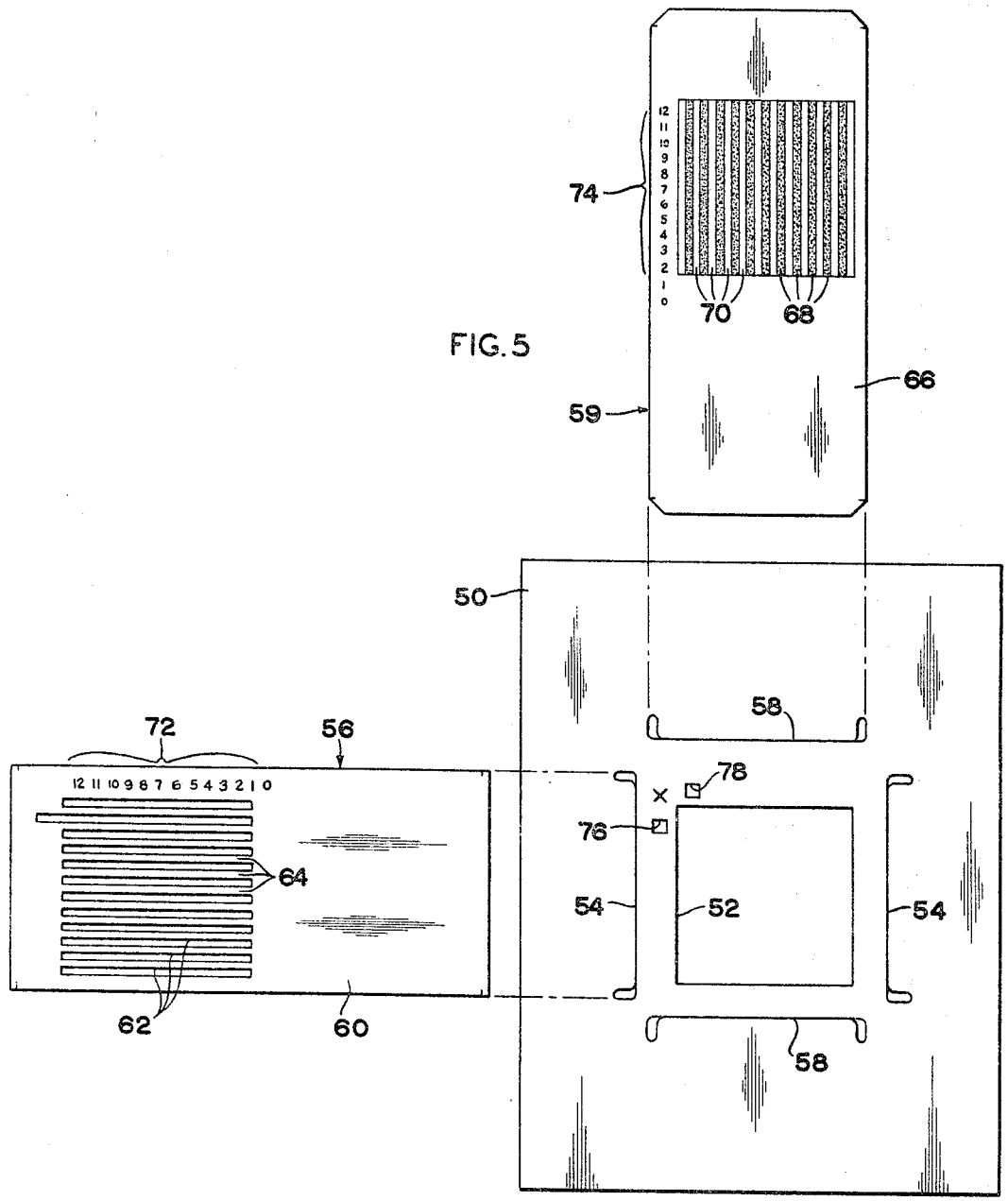

United States Patent Office 3,432,943
Patented Mar. 18, 1969

3,432,943
MATHEMATICS TEACHING DEVICE
Stephen L. Merkel, Bay Village, Ohio, assignor to Educational Research Council of Great Cleveland, Cleveland, Ohio, a corporation of Ohio
Filed Mar. 2, 1967, Ser. No. 619,984
U.S. Cl. 35—31     6 Claims
Int. Cl. G09b 19/02

ABSTRACT OF THE DISCLOSURE

A mathematics teaching device for displaying indicia in columns and rows including a frame having a window, a horizontal slide for varying the number of columns of indicia visible in the window and a vertical slide for varying the number of rows of indicia visible in the window.

---

This invention relates to the art of educational visual aids, and more particularly to a mathematics teaching device.

The present invention is particularly applicable as an aid to teaching multiplication, and it will be described with particular reference thereto; however, it will be appreciated that the invention has broader applications and may be used as an aid in teaching other mathematical operations and concepts.

The techniques for introducing rudimentary mathematics to grade school students have undergone sweeping changes in recent years. Prior emphasis upon memorization, as a first step toward skills developments, has in large measure been replaced by a conceptual understanding of mathematical operations.

Thus, in teaching multiplication, memorization of the multiplication tables, has been supplanted by an understanding of the "commutative," "associative" and "distributive" properties (all defined hereinafter) of multiplication. Accordingly, there is a need for a mathematics teaching device which will assist the student in understanding the meaning and properties of multiplication. The present invention is addressed to filling this need.

A better understanding of the present invention may be had by first defining the terms used to characterize the properties of multiplication.

The "commutative" property states that the order of factors (i.e., multiplier and multiplicand) can be changed without changing the result. Thus:

$$6 \times 4 = 4 \times 6$$

The "associative" property states that changing the grouping of factors does not change the result. Thus:

$$(4 \times 2) \times 3 = 4 \times (2 \times 3)$$

The "distributive" property states that one factor may be redefined as a sum of addends, and the other factor distributed over the addends. Thus:

$$6 \times 5 = 6(3+2) = (6 \times 3) + (6 \times 2)$$

where 5 is redefined as the sum of addends 3 and 2; and 6 is distributed over the addends.

The mathematics teaching device of the present invention permits the graphic illustration of these properties of multiplication. This is accomplished by providing an array of indicia, aligned in a variable number of columns and rows, and providing means for independently varying the number of columns and rows in accordance with an illustrative example.

Therefore, in accordance with the present invention, there is provided in a mathematics teaching device operative to produce an array of indicia, aligned in a variable number of columns and rows: framing means having a window portion operative to expose the array therethrough; horizontal slide means having means operative to vary the number of columns of indicia in the array exposed through the window portion; and vertical slide means, having means operative to vary the number of rows of indicia in the array exposed through the window portion.

Accordingly, it is an object of the invention to provide a mathematics teaching device of improved design.

A further object of the invention is to provide a mathematics teaching device operative to assist students in understanding the meaning and properties of multiplication.

Yet another object of the invention is to provide a mathematics teaching device capable of graphically illustrating the commutative, associative, and distributive properties of multiplication.

These and other objects and advantages will become apparent from the following detailed desecription of a preferred embodiment of the invention when read in connection with the accompanying drawings, in which:

FIGURE 1 is a schematic, pictorial view of a preferred embodiment of the present invention;

FIGURE 2 is a schematic, exploded view of the embodiment shown in FIGURE 1;

FIGURE 3 is a schematic, fragmentary section view taken generally along 3—3 of FIGURE 1;

FIGURE 5 is a schematic, exploded view of the embodiment shown in FIGURE 4.

Figure 4:
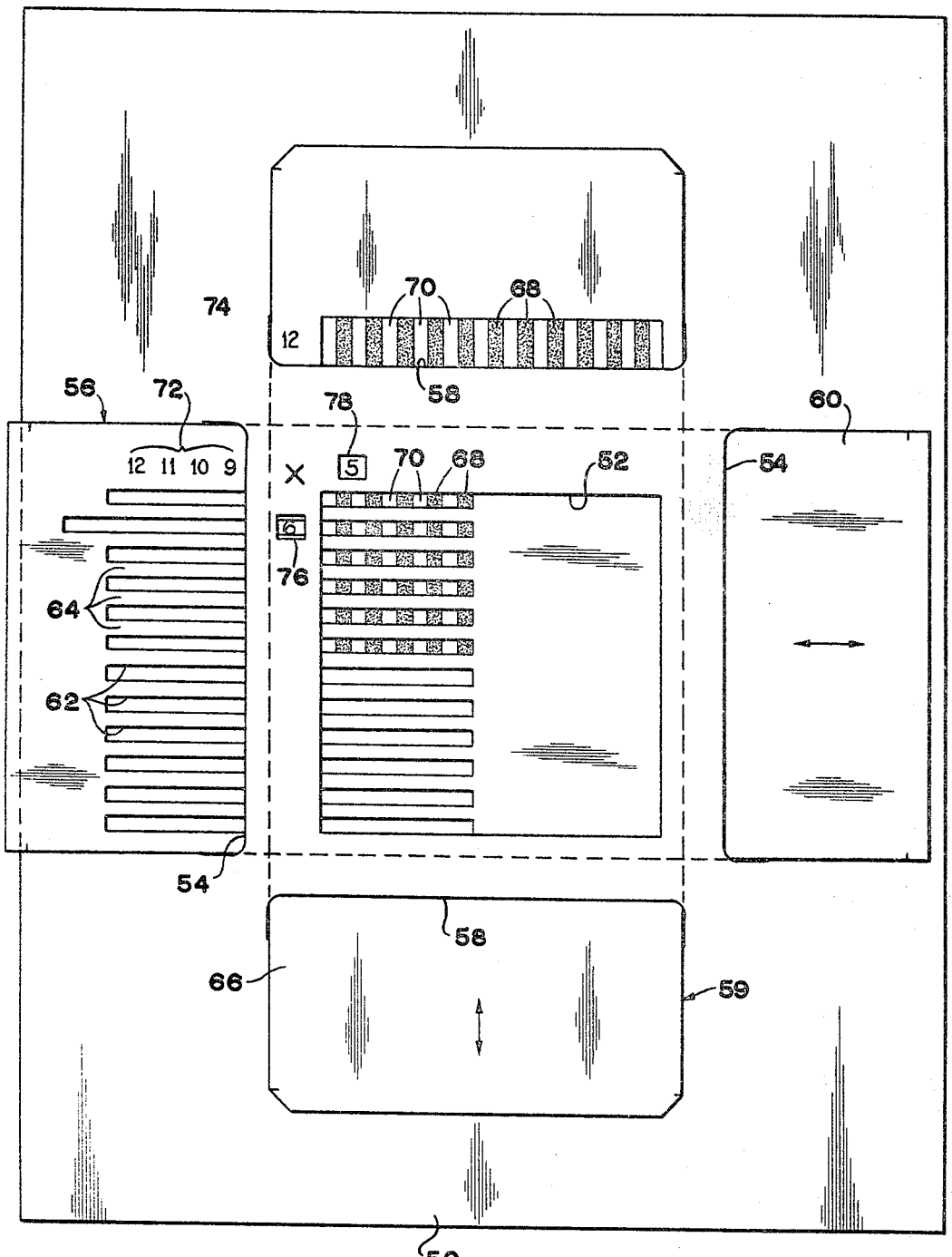
FIGURE 4 is a schematic plan view of second embodiment of the present invention.

Referring now to the drawings, wherein the showings are for purposes of illustrating preferred embodiments of the invention only, and not for the purpose of limiting the same, FIGURES 1 and 2 show a mathematics teaching device comprising a framing means designated generally as 10, comprising top plate 12 having window portion 14, and fold-down corners 16. Framing means 10 further comprises rear plate 18, provided with an array of indicia 20 aligned in columns and rows. As best seen in FIGURE 3, fold-down corners 16 of top plate 12 are adapted to receive corner portions of rear plate 18, thus, securing the two plates together as an integral body.

The device also includes horizontal slide means designated generally as 22 operative for sliding engagement between top plate 12 and rear plate 18, within the confines of opposed fold-down corner 16. Horizontal slide means 22 comprises upstanding ends 24, transparent portion 26, and opaque portion 28 having leading edge 30 parallel to the columns of indicia 20. In the preferred embodiment illustrated, the horizontal slide means is at least as wide as window portion 14 is high, so that the entire window portion can be used to develop indicia.

The device further includes vertical slide means designated generally as 32 operative for sliding engagement between top plate 12 and rear plate 18, within the confines of opposed fold-down corners 16. Vertical slide means 32 comprises upstanding ends 34, transparent portion 36, and opaque portion 38 having leading edge 40 parallel to the rows of indicia 20. In the preferred embodiment illustrated the vertical slide means is at least as wide as window portion 14 is wide, so that the entire window portion can be used to develop indicia.

Horizontal slide means 22 and vertical slide means 32 are provided respectively with scales of numerals 42 and 44. Top plate 12 is provided with viewers 46 and 48, approximately positioned to expose a numeral in scales 42 and 44, respectively. The numeral visible through viewer 46 corresponds to the number of columns of indicia 20 exposed in window portion 14 of top plate 12, which in turn depends upon the position of leading edge 30 of opaque portion 28 of horizontal slide means 22. The numeral visible in viewer 48 corresponds to the number of rows of indicia 20 exposed in window portion 14 of top plate 12, which in turn is dependent upon the position of leading edge 40 of opaque portion 38 of vertical slide means 32. Thus, if one wishes to multiply 6×4, horizontal slide means 22 is moved until the numeral 6 appears in viewer 46 and vertical slide means 32 is moved until the numeral 4 appears in viewer 48. These adjustments expose 6 columns of indicia and 4 rows of indicia in window portion 14 of top plate 12. The total number of exposed indicia equals the product of 6×4, or 24.

The "commutative" property of multiplication can be illustrated with the device by reversing the above described adjustment so that the numeral 4 is visible in viewer 46 and the numeral 6 is visible in viewer 48. This adjustment exposes 4 columns of indicia and 6 rows of indicia. The total number of exposed indicia, 24, equals the product of 4×6 which equals the product of 6×4, thus, illustrating that the order of factors may be changed without changing the result.

The "associative" property of multiplication can be illustrated with the device by performing the necessary adjustments to confirm that:

$$(4\times 2)\times 3 = 4\times (2\times 3)$$

The product for the left hand side of the equation is found by adjusting the slides to give the product of the grouping (4×2), totaling the indicia, readjusting one of the slides for that total, and readjusting the other slide for 3. The product for the right hand side of the equation is found by adjusting the slides to give the product of the grouping (2×3), totaling the indicia, readjusting one of the slides for that total, and readjusting the other slide for 4.

In a similar manner the "distributive" property of multiplication can be illustrated with the device confirming the identity:

$$6\times 5 = (6\times 3) + (6\times 2)$$

The required slide adjustments to accomplish this should now be apparent from the foregoing discussion.

FIGURES 4 and 5 show a second embodiment of the present invention wherein the mathematics teaching device comprises framing means 50, having window portion 52, a pair of opposed slots 54 adapted to receive horizontal slide means 56, a second pair of opposed slots 58 disposed generally at right angles to the first mentioned pair of opposed slots, adapted to receive vertical slide means 59.

Horizontal slide means 56 comprises a solid portion 60 and a portion comprising a series of generally parallel slotted openings 62 separated by bars 64 of approximately equal width. In the preferred embodiment illustrated, horizontal slide means 56 is at least as wide as window portion 52 is high, so that the entire window portion can be used to develop indicia.

Vertical slide means 59 comprises solid portion 66 and a portion comprising a series of generally parallel stripes 68 of one color, alternated with stripes 70 of of a contrasting color. In the preferred embodiment illustrated, vertical slide means 59 is at least as wide as window portion 52 is wide, so that the entire window portion can be used to develop indicia.

As best seen in FIGURE 4, the device is assembled by inserting vertical slide means 59 downwardly into the upper slot 58, behind window portion 52 of framing means 50, and then upwardly through the lower slot 58. Horizontal slide means 56 is inserted downwardly through left hand slot 54, behind window portion 52 of framing means 50, but in front of vertical slide means 59, and then upwardly through right hand slot 54. To the extent that the slotted portion of horizontal slide means 56 and the stripe portion of vertical slide means 59 overlap, they form an array of indicia, aligned in columns and rows. Movement of horizontal slide means 56 to the right, as shown in FIGURE 4 will increase the number of columns of indicia, and movement of vertical slide means 59 downwardly, as shown in FIGURE 4, will increase the number of rows of indicia.

Horizontal slide means 56 is provided with a scale of numerals 72, and vertical slide means 59 is provided with a scale of numerals 74. Framing means 50 is provided with viewers 76 and 78 so positioned as to render visible a numeral in scales 74 and 72, respectively. The numeral visible in viewer 78 corresponds a number of columns of indicia exposed in window portion 52, and the numeral visible in viewer 76 corresponds to the number of rows of indicia exposed in window portion 52.

Any number of contrasting color schemes may be used to develop the indicia in this embodiment of the invention. In one preferred combination, horizontal slide means 56, framing means 59 are colored black or dark gray, and stripes 68 of vertical slide means 59 are colored white or off-white.

The operation of the embodiment shown in FIGURES 4 and 5 is identical to that described in conjunction with the embodiment shown in FIGURES 1, 2 and 3.

The present invention has been described in conjunction with certain structural embodiments; however, it is to be appreciated that various structural changes may be made in the illustrated embodiments without departing from the intended scope and spirit of the present invention as defined in the appended claims.

Having thus described my invention, I claim:

1. In a mathematics teaching device operative to produce an array of indicia aligned in a variable number of columns and rows: framing means having a window portion operative to expose said array therethrough; a horizontal slide at least as wide as said window portion is high having means operative to vary the number of columns of indicia in said array exposed through said window portion; and a vertical slide at least as wide as said window portion is wide having means operative to vary the number of rows of indicia in said array exposed through said window portion.

2. In a mathematics teaching device operative to produce an array of indicia aligned in a variable number of columns and rows: framing means having a window portion operative to expose said array therethrough; horizontal slide means having means operative to vary the number of columns of indicia in said array exposed through said window portion; vertical slide means having means operative to vary the number of rows of indicia in said array exposed through said window portion, one of said means operative to vary the number of columns of indicia, and the number of rows of indicia, comprises a series of generally parallel slotted openings, and the other of said means comprises a series of generally parallel stripes of alternating, contrasting color, disposed generally at right angles to said slotted openings.

3. The device as defined in claim 2, wherein said means operative to vary the number of columns of indicia comprises a series of generally parallel slotted openings, and said means operative to vary the number of rows of indicia comprises a series of generally parallel stripes of alternating, contrasting color, disposed generally at right angles to said slotted openings.

4. The device as defined in claim 1, wherein said framing means additionally comprises a plate provided with an array of indicia.

5. The device as defined in claim 4, wherein said horizontal slide means and said vertical slide means each has a transparent portion; said means operative to vary the number of columns of indicia comprises an opaque portion of said horizontal slide having a leading edge substantially parallel to said columns of indicia; and said means operative to vary the number of rows of indicia comprises an opaque portion of said vertical slide, having a leading edge substantially parallel to said rows of indicia.

6. The device as defined in claim 1, wherein said horizontal slide means and said vertical slide means are each provided with a scale of numerals, and said framing means are provided with viewers operative to expose one numeral of each scale; whereby the exposed numeral in the horizontal slide scale corresponds to the number of columns of indicia exposed in said window portion and the exposed numeral in the vertical slide scale corresponds to the number of rows of indicia exposed in said window portion.

References Cited

UNITED STATES PATENTS 1,867,888    7/1932    Obidine _____ 35—31 XR

FOREIGN PATENTS 347,415    1/1922    Germany.

EUGENE R. CAPOZIO, *Primary Examiner.*